United States Patent
Bouthemy et al.

(10) Patent No.: US 8,951,038 B2
(45) Date of Patent: Feb. 10, 2015

(54) DEVICE FOR INJECTION-MOULDING A PART

(75) Inventors: Philippe Bouthemy, Issy Les Moulineaux (FR); Serge Dillenseger, Jouy Le Moutier (FR); Patrick Pourfilet, Asnieres Sur Seine (FR); Daniel Quach, Fontenay Sous Bois (FR)

(73) Assignee: SNECMA, Paris (FR)

( * ) Notice: Subject to any disclaimer, the term of this patent is extended or adjusted under 35 U.S.C. 154(b) by 178 days.

(21) Appl. No.: 13/696,187

(22) PCT Filed: May 4, 2011

(86) PCT No.: PCT/FR2011/051011
§ 371 (c)(1),
(2), (4) Date: Dec. 7, 2012

(87) PCT Pub. No.: WO2011/138560
PCT Pub. Date: Nov. 10, 2011

(65) Prior Publication Data
US 2013/0078335 A1 Mar. 28, 2013

(30) Foreign Application Priority Data
May 6, 2010 (FR) ...................................... 10 53549

(51) Int. Cl.
| | | |
|---|---|---|
| *B29C 45/66* | (2006.01) | |
| *B29C 45/03* | (2006.01) | |
| *B29C 45/36* | (2006.01) | |
| *B22C 7/02* | (2006.01) | |
| *B22C 9/06* | (2006.01) | |
| *B22C 21/14* | (2006.01) | |

(52) U.S. Cl.
CPC ................. *B29C 45/03* (2013.01); *B29C 45/36* (2013.01); *B22C 7/02* (2013.01); *B22C 9/064* (2013.01); *B22C 21/14* (2013.01)
USPC .......................................... 425/577; 425/468

(58) Field of Classification Search
CPC .............................. B29C 45/36; B29C 33/485
USPC .................................................. 425/577, 468
See application file for complete search history.

(56) References Cited

U.S. PATENT DOCUMENTS

| | | | |
|---|---|---|---|
| 4,905,751 A | 3/1990 | Dupin | |
| 5,323,840 A | 6/1994 | Usui et al. | |
| 6,024,559 A * | 2/2000 | Coleman | ........................ 425/572 |

FOREIGN PATENT DOCUMENTS

| | | |
|---|---|---|
| DE | 10 2008 004 023 | 7/2009 |
| EP | 0 287 425 | 10/1988 |

(Continued)

OTHER PUBLICATIONS

International Search Report Issued Jul. 29, 2011 in PCT/FR11/51011 Filed May 4, 2011.

*Primary Examiner* — Tim Heitbrink
(74) *Attorney, Agent, or Firm* — Oblon, Spivak, McClelland, Maier & Neustadt, L.L.P.

(57) ABSTRACT

A tooling for injection-molding a part, the tooling including two cavity blocks each including a cavity formed therein of a shape corresponding to a shape of a part that is to be molded once the cavity blocks have been superposed. At least one of the cavity blocks includes a mechanism for positioning a core, which mechanism includes at least one bearing surface for bearing against the core and at least one presser screw screwed into a threaded passage of the cavity block for purpose of holding the core in position against the bearing surface. The tooling further includes a force-limiter limiting force applied to the core by the presser screw.

11 Claims, 4 Drawing Sheets

(56) References Cited

FOREIGN PATENT DOCUMENTS

| | | | | |
|---|---|---|---|---|
| EP | 0 585 136 | | 3/1994 | |
| FR | 2841946 | * | 1/2004 | |
| JP | 60 102248 | | 6/1985 | |
| JP | 60102248 | * | 6/1985 | |

* cited by examiner

DEVICE FOR INJECTION-MOULDING A PART

BACKGROUND

The present invention relates to a device for injection-molding a part, in particular a wax model.

Such a model is used in a lost wax molding method in a number of fields and for example for molding high pressure turbine blades for a turbine engine such as a turboprop or a turbojet.

In this method, one or more parts are injection-molded by using injection-molding tooling that has a cavity of shape corresponding to the shape of the model that is to be obtained. When the model has a cooling circuit, a ceramic core is used. In this event, the wax is injected into the cavity, around the core.

The wax models as obtained in this way are then mounted as a cluster on a support.

The cluster is then dipped in a bath of ceramic, referred to as a slip, and then dusted with a ceramic powder (stuccoworking). Dipping and stuccoworking are repeated several times until a layer of ceramic is obtained that is sufficiently thick and that forms a shell around the cluster.

The wax is then removed from the ceramic shell by passing the assembly in an autoclave where steam under pressure and at high temperature causes the wax to melt (dewaxing).

The shell is then baked in an oven in order to acquire sufficient mechanical strength for it to be used as a mold.

Metal, e.g. a nickel-based alloy, is then cast into the shell. After cooling, the shell is knocked out and then the various parts are removed from the cluster, i.e. they are separated from their common support.

When a core is used, it is removed chemically with the help of a bath.

The parts are then trimmed, ground, and then inspected.

As a general rule, tooling for injection-molding the wax model comprises two cavity blocks having a cavity formed therein of shape that matches the shape of the part that is to be molded once the cavity blocks are superposed. At least one of the cavity blocks is fitted with means for positioning the core, which means comprise at least one bearing surface for bearing against the core and at least one presser screw screwed into a threaded passage of the cavity block for the purpose of holding the core in position.

The core must be clamped strongly enough for it to be held properly in position and to ensure that it does not move while parts are being molded. However, if this clamping is too strong, that can deform, move, or damage the cores, such that the final parts made by molding no longer comply with their specifications.

A particular object of the invention is to provide a solution to this problem that is simple, effective, and inexpensive.

BRIEF SUMMARY

To this end, the invention provides tooling for injection-molding a part, the tooling comprising two cavity blocks each having a cavity formed therein of a shape corresponding to the shape of the part that is to be molded once the cavity blocks have been superposed, at least one of the cavity blocks being fitted with means for positioning a core, which means comprise at least one bearing surface for bearing against the core and at least one presser screw screwed into a threaded passage of the cavity block for the purpose of holding the core in position, the tooling being characterized in that it includes force-limiter means for limiting the force applied to the core by the presser screw.

The force-limiter means serve to avoid any damage to or movement of the core.

In a characteristic of the invention, the force-limiter means are torque-limiter means arranged between a tightening head and a threaded portion of the presser screw and designed to transmit clamping torque from the head to the threaded portion so long as said torque is less than a determined value, and to decouple the head from the threaded portion when said torque is greater than the determined value.

Advantageously, the tooling includes two surfaces for bearing against the core and two presser screws arranged facing the bearing surfaces and designed to hold the core (10) in position against the two bearing surfaces, the screws extending substantially perpendicularly to each other and each including torque-limiter means.

The core is thus properly held in position in the cavity of the bottom cavity block by the screws.

In one possibility of the invention, the determined value of the clamping torque beyond which the head is decoupled from the threaded portion of the presser screw lies in the range 0.1 newton-meters (Nm) to 5 Nm, and is preferably about 1 Nm.

Such a level of torque suffices to hold the core in position, while avoiding any degradation, deformation, or movement of the core.

In preferred manner, the tooling includes a stationary bottom cavity block and a movable top cavity block, the bearing surface being formed in the cavity of the stationary cavity block, the presser screw being mounted on the stationary cavity block.

In another characteristic of the invention, the two cavity blocks are mounted to pivot relative to each other about a pin between a molding position in which the two cavity blocks are superposed, and an un-molding position in which the two cavity blocks are spaced apart.

In advantageous manner, at least one of the cavity blocks is mounted to pivot about the pin via at least one rolling bearing, e.g. a ball bearing.

BRIEF DESCRIPTION OF THE DRAWINGS

The invention can be better understood and other details, characteristics, and advantages of the invention appear on reading the following description made by way of non-limiting example and with reference to the accompanying drawings, in which.

DETAILED DESCRIPTION

Figure 1:
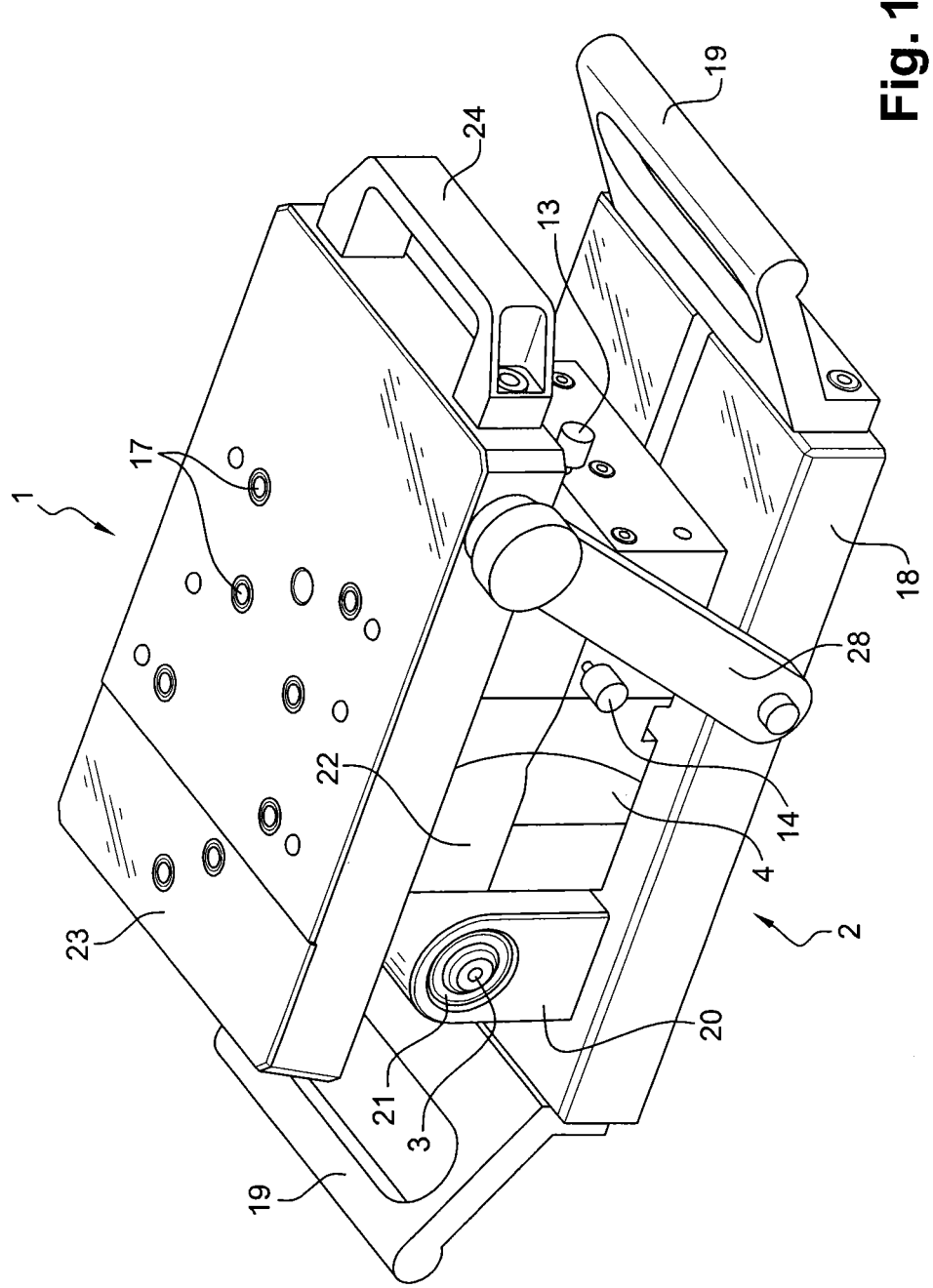
FIG. 1 is a perspective view of tooling of the invention for injection-molding a part, the tooling being shown in the closed position.
Figure 2:
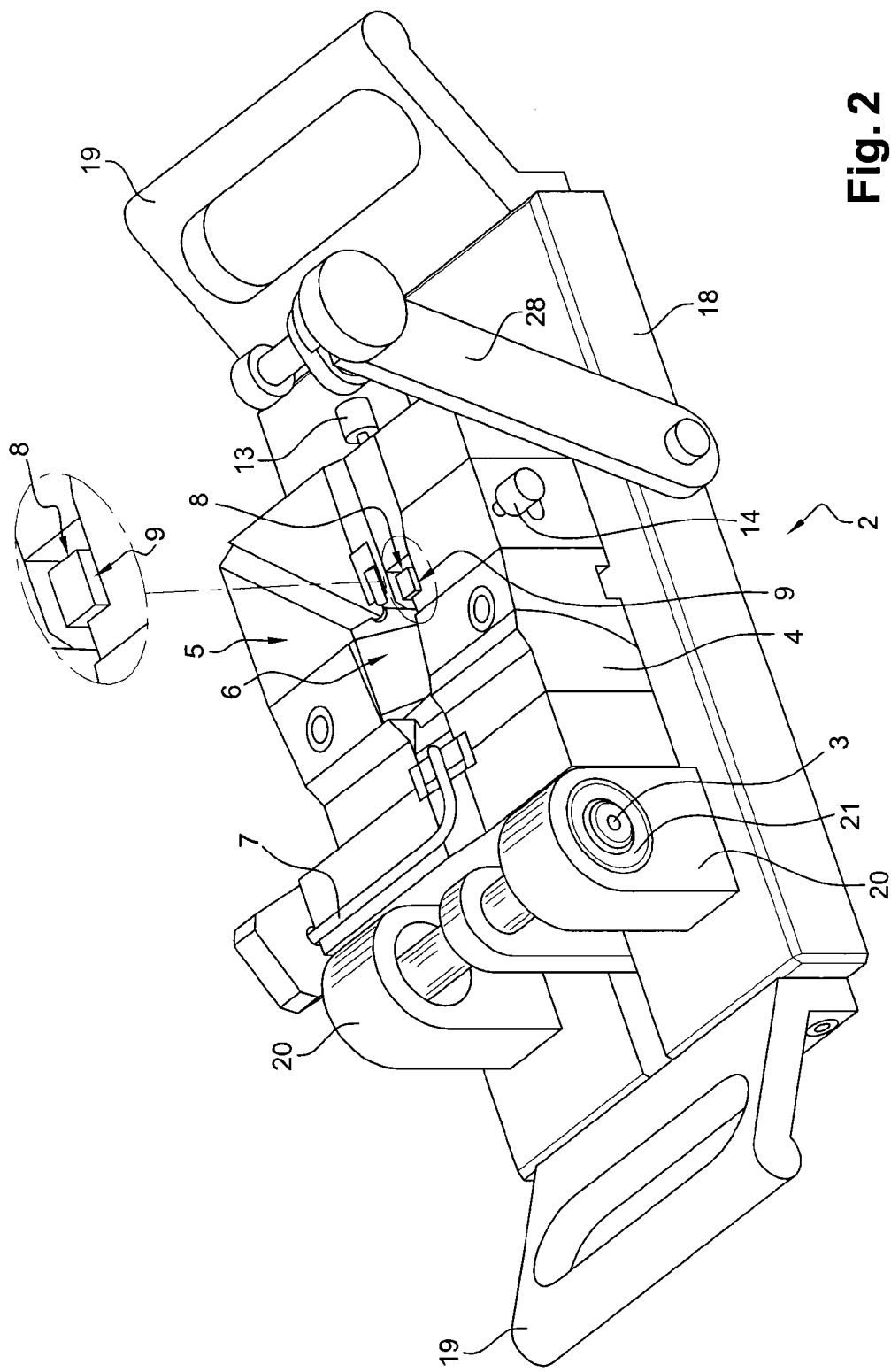
FIG. 2 is a perspective view of the bottom portion of the injection-molding tooling of FIG. 1.

FIGS. 1 and 2 show tooling of the invention for injection-molding a wax model, the tooling comprising a top portion 1 and a bottom portion 2 pivotally mounted relative to each other about a pin 3.

More particularly, the bottom portion 2 comprises a cavity block 4 of generally rectangular shape having its top surface forming a join plane 5 in which there are provided a cavity 6 and an injection channel 7 (FIG. 2).

Figure 3:
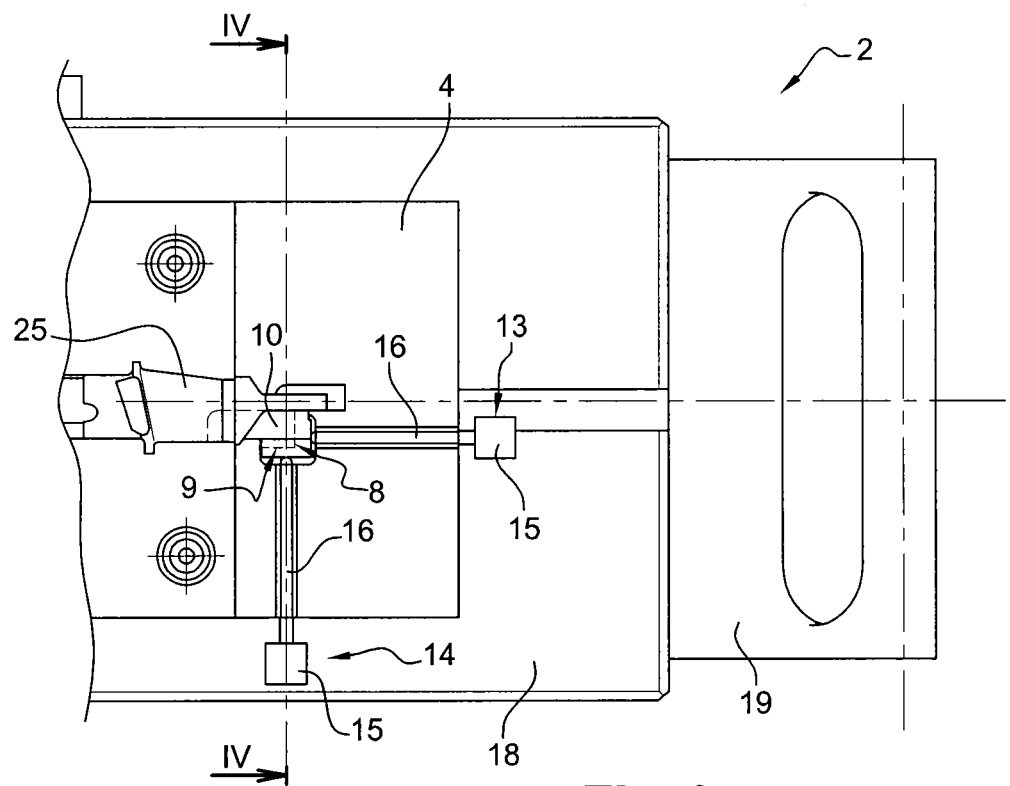
FIG. 3 is a plan view of a fraction of the bottom portion.
Figure 4:
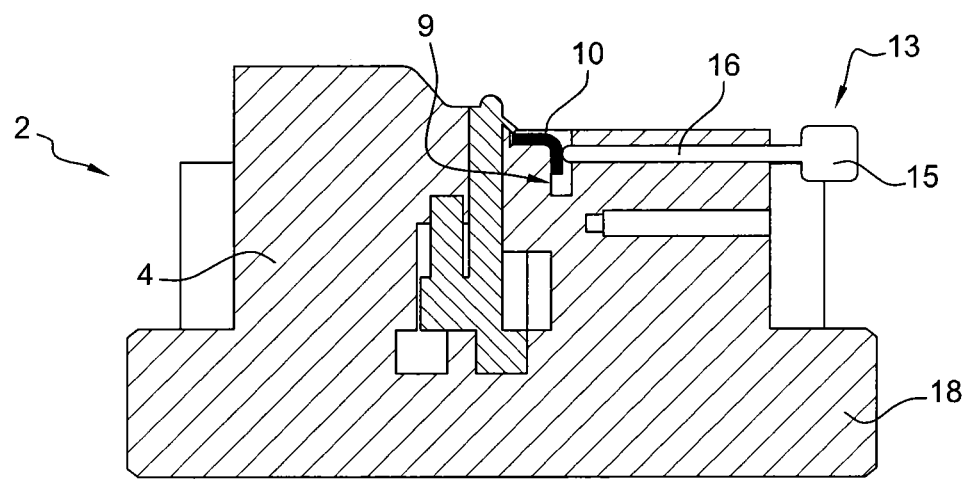
FIG. 4 is a cross-section view of the bottom portion on line IV-IV of FIG. 3.
Figure 5:
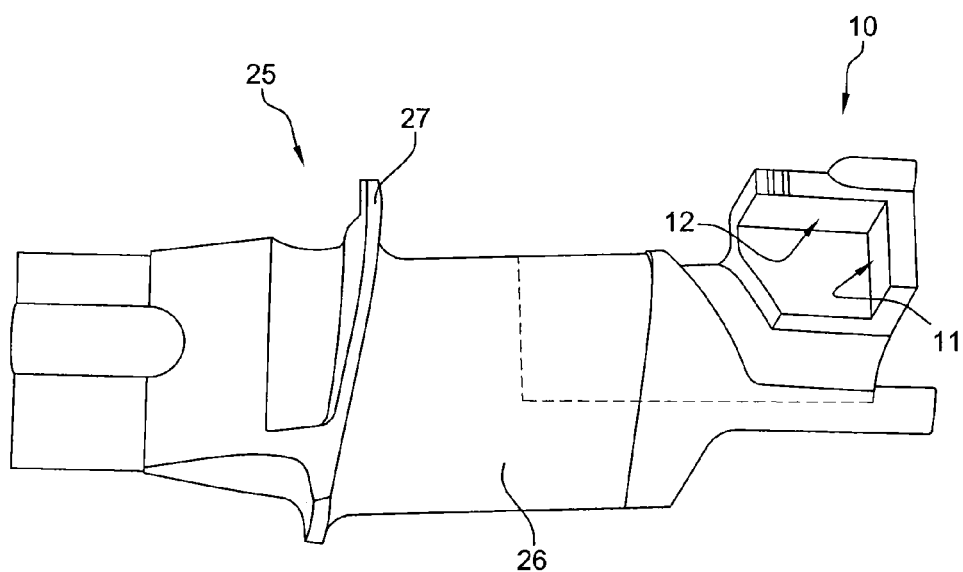
FIG. 5 is a perspective view of a wax model made by molding using the tooling of FIGS. 1 to 4, together with the corresponding core.

As can be seen better in FIGS. 3 and 4, the bottom cavity block 4 has a first bearing surface 8 (FIG. 3) extending transversely relative to the cavity block 4, and a second bearing surface 9 (FIG. 4) extending longitudinally relative to the cavity block 4, each of the bearing surfaces 8, 9 serving to bear against a corresponding surface 11, 12 of a core 10 (FIG. 5).

The bottom cavity block 4 is fitted with two presser screws 13, 14 screwed into threaded passages of the cavity block 4 for the purpose of holding the core 10 in position against the bearing surfaces 8, 9, the screws 13, 14 extending parallel to the join plane 5.

The presser screws 13, 14 are arranged facing the bearing surfaces 8, 9 and they extend perpendicularly to these bearing surfaces. The screws 13, 14 thus extend substantially perpendicularly relative to each other, and each of them includes torque-limiter means. These means are arranged between a camping head 15 and the threaded portion 16 of each presser screw 13, 14, and they are designed to transmit the clamping torque from the head 15 to the threaded portion 16 so long as said torque is less than a determined value, and to decouple the head 15 from the threaded portion 16 when said torque is greater than the determined value.

Such torque-limiter means are known for other applications, in particular from patent application FR 2 841 946, and their structure is not described in greater detail herein.

These torque-limiter means are calibrated in such a manner that the determined value for the clamping torque beyond which the head 15 is decoupled from the threaded portion 16 of the presser screw 13, 14 lies in the range 0.1 Nm to 5 Nm, and is preferably about 1 Nm. Once the torque has been exceeded, a clicking noise may be produced so as to inform the operator.

The bottom cavity block 4 is mounted using screws 17 on an elongate and plane bottom plate 18 that is likewise rectangular in shape. The two opposite ends of the plate 18 are fitted with handles 19. The plate 18 also has two lateral lugs 20 arranged on either side of a longitudinal midplane, and forming a clevis in which the pin 3 is mounted. More particularly, the pin 3 is guided by two ball bearings 21 mounted in the lugs 20, and it extends perpendicularly to the above-mentioned midplane.

In the same manner, the top portion 1 of the injection-molding tooling includes a top cavity block 22 in which a cavity 6 is formed to face the cavity in the bottom cavity block 4 once the cavity blocks 4, 22 are superposed.

The top cavity block 22 is fastened to a top plate 23 that is mounted to pivot relative to the bottom plate 18 about the pin 3.

The end of the top plate that is remote from the pivot pin 3 is fitted with a handle 24.

There follows a description in greater detail of the method of molding a wax model 25 of a blade.

When the model 25 includes a hollow portion, such as a cooling circuit, a ceramic core 10 is mounted in the cavity 6 of the bottom cavity block 4.

The presser screws 13, 14 are then tightened so that the surfaces 11, 12 of the core 10 come to bear against the bearing surfaces 8, 9 of the bottom cavity block 4. For this purpose, the operator exerts torque on the screws that is greater than the maximum torque authorized by the torque-limiter means, and the operator is informed that the torque is indeed greater by a clicking sound, as mentioned above.

Once the core 10 has been correctly positioned and held in the bottom cavity block 4, the injection-molding tooling is closed, i.e. the top and bottom portions 1, 2 are pivoted so as to superpose the two cavity blocks 4, 22, and thus also the cavities 6. The shape defined by the cavities 6, when situated facing each other, corresponds to the shape to be given to the part 25 that is to be molded, as can be seen in FIG. 5. In particular, the cavities 6 define the shape of a blade 25 having an airfoil 26 and a platform 27.

A press (not shown) then bears against each of the outside faces of the plates 18, 23 and wax is injected, via the injection channel 7, into the cavities 6 around the core 10, and then allowed to cool so as to solidify and form a wax model 25 of the blade (FIG. 5).

The injection-molding tooling is then opened by pivoting of the top portion 1 about the pin 3, and the model 25 together with its core 10 is then removed from the cavity 6.

The invention claimed is:

1. A tooling for injection-molding a part, the tooling comprising:
    two cavity blocks each including a cavity formed therein of a shape corresponding to a shape of a part that is to be molded once the cavity blocks have been superposed;
    at least one of the cavity blocks including means for positioning a core, which means comprises at least one bearing surface for bearing against the core and at least one presser screw screwed into a threaded passage of the cavity block such that an end portion of the at least one presser screw clamps the core in position against the bearing surface; and
    force-limiter means for limiting a force applied to the core by the presser screw, wherein
    the force-limiter means includes torque-limiter means arranged between a tightening head and a threaded portion of the presser screw and configured to transmit clamping torque from the head to the threaded portion so long as the torque is less than a determined value, and to decouple the head from the threaded portion when the torque is greater than the determined value.

2. A tooling according to claim 1, comprising two bearing surfaces for bearing against the core and two presser screws arranged facing the bearing surfaces and configured to hold the core in position against the two bearing surfaces, the screws extending substantially perpendicularly to each other and each including torque-limiter means.

3. A tooling according to claim 1, wherein the determined value of the clamping torque beyond which the head is decoupled from the threaded portion of the presser screw lies in a range 0.1 Nm to 5 Nm, or is about 1 Nm.

4. A tooling according to claim 1, including a stationary bottom cavity block and a movable top cavity block, the bearing surface being formed in the cavity of the stationary cavity block, the presser screw being mounted on the stationary cavity block.

5. A tooling according to claim 1, wherein the two cavity blocks are mounted to pivot relative to each other about a pin between a molding position in which the two cavity blocks are superposed, and an un-molding position in which the two cavity blocks are spaced apart.

6. A tooling according to claim 5, wherein at least one of the cavity blocks is mounted to pivot about the pin via at least one rolling bearing, or a ball bearing.

7. A tooling according to claim 1, wherein the determined value is in the range 0.1 Nm to 5 Nm.

8. A tooling according to claim 1, wherein the determined value is about 1 Nm.

9. A tooling according to claim 1, further comprising:
an injection channel that carries wax into the cavities around the core.

10. A tooling according to claim 1, wherein the cavities define a shape of a blade having an airfoil and a platform.

11. A tooling according to claim 1, wherein the core defines a shape of a cooling circuit.

\* \* \* \* \*